(12) United States Patent
Kirk

(10) Patent No.: X6591
(45) Date of Patent: Jun. 13, 1831

(54) ORNAMENTS, FROM ANTHRACITE COAL, & C

(76) Inventor: Josiah W. Kirk

United States Patent

Patent No.: X6591

Josiah W. Kirk

Letters Patent.

The Schedule referred to in these Letters Patent and making part of the same containing a description in the words of the words of the said Josiah W. Kirk himself of his improvement in making polished articles of ornament or use from Anthracite or bituminous Coal.

This discovery consists in making polished candlesticks salt cellars ink-stands sand Boxes [illegible] [illegible] picture frames clock cases and mantle ornaments such as urns pyramids &c out of anthracite or bituminous stone coal instead of other materials. This material may be reduced to the proper size shape and polish among other means. by hewing sawing or grinding it down when a plain surface is wanted. or by a turning lathe drill tools when a round surface is required. and then smoothed and polished by the use of fine stones emery charcoal or other material of fine grit. The meritorious discovery of which I claim to be the discoverer and to have the right to a Patent is the use and application of anthracite or bituminous stone coal to the purpose of making the aforesaid polished articles of ornament and use. whether reduced to the proper size shape and polish by the above described or other means Witness my hand this fifth day of May 1831
Josiah W. Kirk Exd
[illegible]

Witnesses
Chs. R. Rice
Joseph S. Brewster